United States Patent [19]

Gross et al.

[11] Patent Number: 5,431,260
[45] Date of Patent: Jul. 11, 1995

[54] SHOCK ABSORBER HAVING AN ELASTIC GASKET UPPER MOUNTING ASSEMBLY

[75] Inventors: Josef Gross, Sinzig-Bad Bodendorf; Heinz Sydekum, Dittelbrunn; Steffen Heyn, Schweinfurt; Kilian Göbel, Stadtlauringen, all of Germany

[73] Assignees: Fichtel & Sachs AG, Schweinfurt; Boge GmbH, Bonn, both of Germany

[21] Appl. No.: 166,570

[22] Filed: Dec. 13, 1993

[30] Foreign Application Priority Data

Dec. 11, 1992 [DE] Germany .................. 42 41 853.4

[51] Int. Cl.⁶ .................. B60G 13/00; F16F 9/54
[52] U.S. Cl. .................. 188/321.11; 267/293; 267/294
[58] Field of Search ............. 267/219, 220, 293, 294, 267/141.1, 141, 152; 280/668, 673

[56] References Cited

U.S. PATENT DOCUMENTS 2,486,741 11/1949 Gabriel .................. 267/293
2,598,762 6/1952 Oath .................. 267/294
2,656,182 10/1953 Willison .................. 267/293
2,981,534 4/1961 Peras .................. 267/220

FOREIGN PATENT DOCUMENTS 1391349 1/1965 France .................. 267/220
887666 8/1953 Germany .................. 267/294
7300913 3/1973 Germany .
642888 7/1962 Italy .................. 267/220

Primary Examiner—Matthew C. Graham
Attorney, Agent, or Firm—Nils H. Ljungman & Associates

[57] ABSTRACT

A shock absorber for motor vehicles having at least one end thereof fastened by means of rubber gaskets to a fastening part. To achieve a fastening which is economical, elastic, and has a high degree of insulation and a long useful life, each rubber gasket of the fastening, around the circumference and on the end surfaces thereof, has elevations and/or depressions which run toward or opposite to one another.

20 Claims, 5 Drawing Sheets

SHOCK ABSORBER HAVING AN ELASTIC GASKET UPPER MOUNTING ASSEMBLY

BACKGROUND OF THE INVENTION

1. Field of the Invention

This invention relates to a shock absorber for motor vehicles, with a piston fastened to a piston rod and upper and lower fastening parts. By means of the upper and lower fastening parts the shock absorber can be fastened to body and/or wheel suspension parts of a motor vehicle. The piston rod and receptacle for receiving the piston rod, with the interposition of rubber gaskets, can be held in a recess of a fastening part that can be connected to the body and/or to the wheel suspension of a motor vehicle.

2. Background of the Invention

Known shock absorber assemblies, for example, German Utility Model No. 73 00 913, which corresponds to U.S. Pat. No. 2,981 534 entitled "Shock Absorbers" disclose such a shock absorber. That shock absorber is connected to the body or to the wheel suspension by means of upper and lower fastening parts. On these shock absorbers, the piston rod is connected to the body by means of a fastening part, whereby to isolate vibrations above and below the fastening part, respective rubber gaskets are threaded onto the piston rod and secured by means of a threaded connection. A disadvantage of this arrangement is that the rubber gaskets, with their smooth end surfaces, are braced against one another, so that there can be insufficient isolation. Further, the rubber gaskets can also become notched or damaged in the vicinity of the fastening part, so that the useful life of the rubber gaskets and the shock absorber is unsatisfactory.

OBJECT OF THE INVENTION

The object of the present invention is to create an economical, elastic fastening for a piston rod with a high degree of isolation, a satisfactory useful life with sufficient noise damping, as well as easy installation, removal and recycling capabilities.

SUMMARY OF THE INVENTION

The invention teaches that this object can be achieved if each rubber gasket has a greatest axial length in the vicinity of each rubber gasket's outside circumference, in addition to other characteristics discussed hereinbelow.

It can thereby be an advantage that, as a result of the use of identically-designed parts, such as rubber gaskets, the installation of the parts can be simple, and preferably not position-specific, whereby the outside edge of the rubber gasket also can perform a sealing function. An additional advantage of this design can be that very good service life characteristics can be achieved, because contact between the entire end surface of the rubber gaskets and the fastening part can be essentially eliminated, as the rubber gasket according to the present invention essentially only contacts the fastening part in the outer circumferential area of the rubber gaskets. An additional advantage can also be that as a result of the configuration or shape of the rubber gaskets, the gaskets can provide a soft characteristic introduction, or damping function, which can lead to good noise isolation.

An essential characteristic of the invention preferably is that the end surfaces, at intervals over their surfaces, can have elevations and/or depressions running toward or opposite one another, depending on the embodiment of the present invention. An advantage of this configuration can be that the end surfaces of the rubber gasket are preferably only in partial contact with the fastening part along the outer circumference of the gasket, so that the damping and isolation characteristic of the entire suspension can be further improved.

To achieve correct operation and also a long, useful life, in which there is preferably no notching of or damage to the rubber gasket on the fastening part, an additional favorable configuration of the invention can be as follows. The present invention can feature a rubber gasket with a preferably ring-shaped recess in the vicinity of the ring-shaped recess of the fastening part. A probable result of this characteristic, is that even when the rubber gaskets are braced against the fastening part, the mechanical load on the rubber gaskets in the vicinity of the load-relief groove can be sharply reduced, so that over the life of such a fastening, there is practically no reason to expect damage to the rubber gaskets themselves.

One aspect of the invention resides broadly in an adjustable shock absorber for motor vehicles, the adjustable shock absorber comprising: a sealed cylinder defining a chamber therein; the cylinder containing a damping fluid; a piston rod sealingly projecting into the cylinder and axially displaceable with respect to the cylinder; a piston attached to the piston rod and disposed within the cylinder to sealingly divide the cylinder into first and second chambers; a connecting passage for allowing damping fluid to flow between the first and the second chambers; a first end and a second end; a first attachment means for securing the first end of the shock absorber to the body or wheel suspension of a motor vehicle; the first attachment means comprising: at least one gasket; the at least one gasket comprising: an elastomeric material; an outer circumference; an inner circumference disposed substantially concentrically to and within the outer circumference; an axial axis and a radial axis; the radial axis being disposed substantially orthogonal to the axial axis; the radial axis being disposed at least from the inner circumference to the outer circumference; a first portion being disposed adjacent the outer circumference between the outer circumference and the inner circumference; a second portion being disposed adjacent the inner circumference between the outer circumference and the inner circumference; the first portion comprising a thickness along the axial axis; the second portion comprising a thickness along the axial axis; the thickness of the first portion being substantially greater than the thickness of the second portion; and a second attachment means for securing the second end of the shock absorber to the other of the body or wheel suspension of a motor vehicle.

BRIEF DESCRIPTION OF THE DRAWINGS

Preferred embodiments of the invention are schematically illustrated in the accompanying drawings, in which.

DESCRIPTION OF THE PREFERRED EMBODIMENTS

Figure 1:
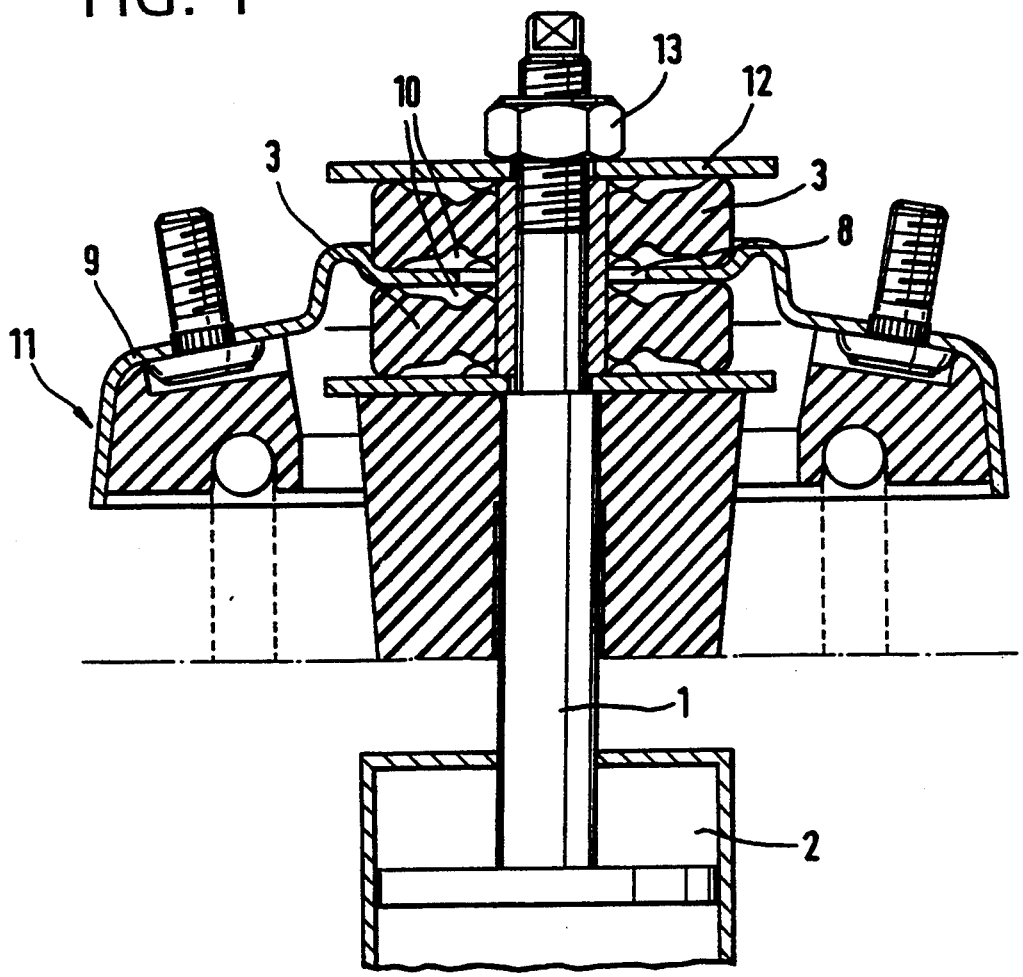
FIG. 1 shows an upper shock absorber fastening of a piston rod with the body of a motor vehicle, in cross section.

The fastening of a shock absorber illustrated in FIG. 1 can have the piston 2 fastened to a piston rod 1, whereby the piston rod can be fastened to the body of a motor vehicle by means of a supporting bearing 11, which bearing 11 preferably has a fastening part 9. The piston rod 1 can be equipped with two rubber gaskets 3, whereby the fastening part 9 can be engaged or disposed between the rubber gaskets 3. By means of the fastening part 9, the shock absorber can be connected to the body or the wheel suspension of a motor vehicle. The rubber gaskets 3 can be braced against the shock absorber and the fastening part 9 by means of a corresponding plate 12, preferably made of metal, and a threaded connection 13.

Figure 1A:
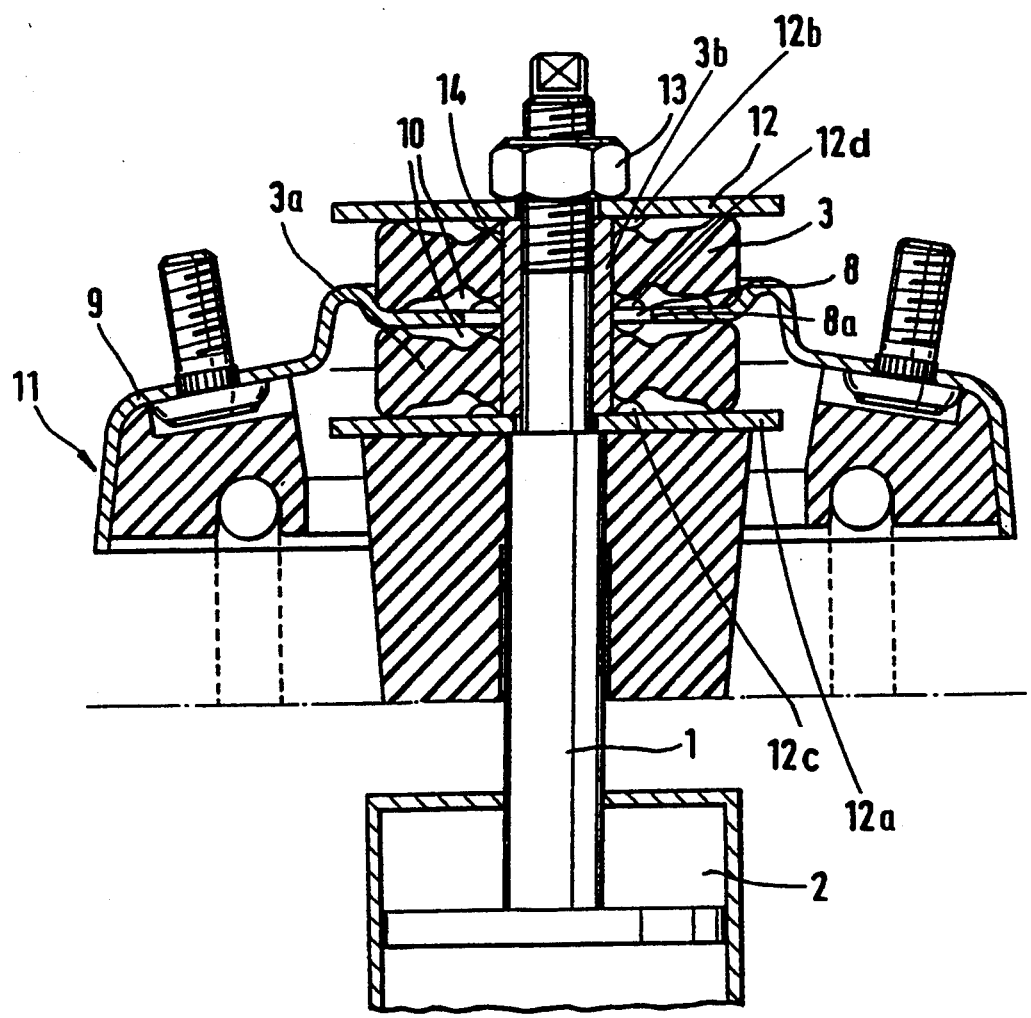
FIG. 1a shows substantially the same view as FIG. 1 but shows additional components.

In an alternative embodiment, as illustrated in FIG. 1a, the plate 12 can be disposed on the piston rod 1 and held in place by means of a nut 13. The plate 12 can preferably brace the rubber gasket 3 against the fastening part 9. Further, an additional metal plate 12a may be used to brace the other rubber gasket 3a between the shock absorber and the fastening part 9.

Figure 2:
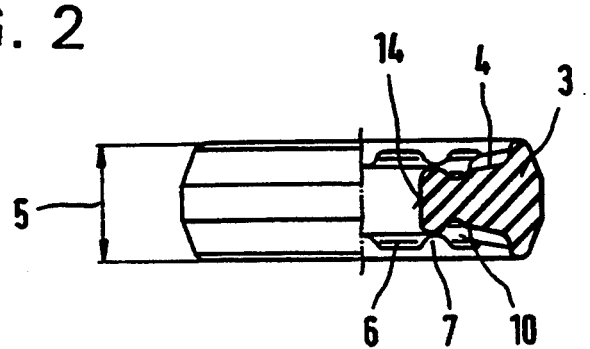
FIG. 2 shows an individual rubber gasket in partial cross section.
Figure 2A:
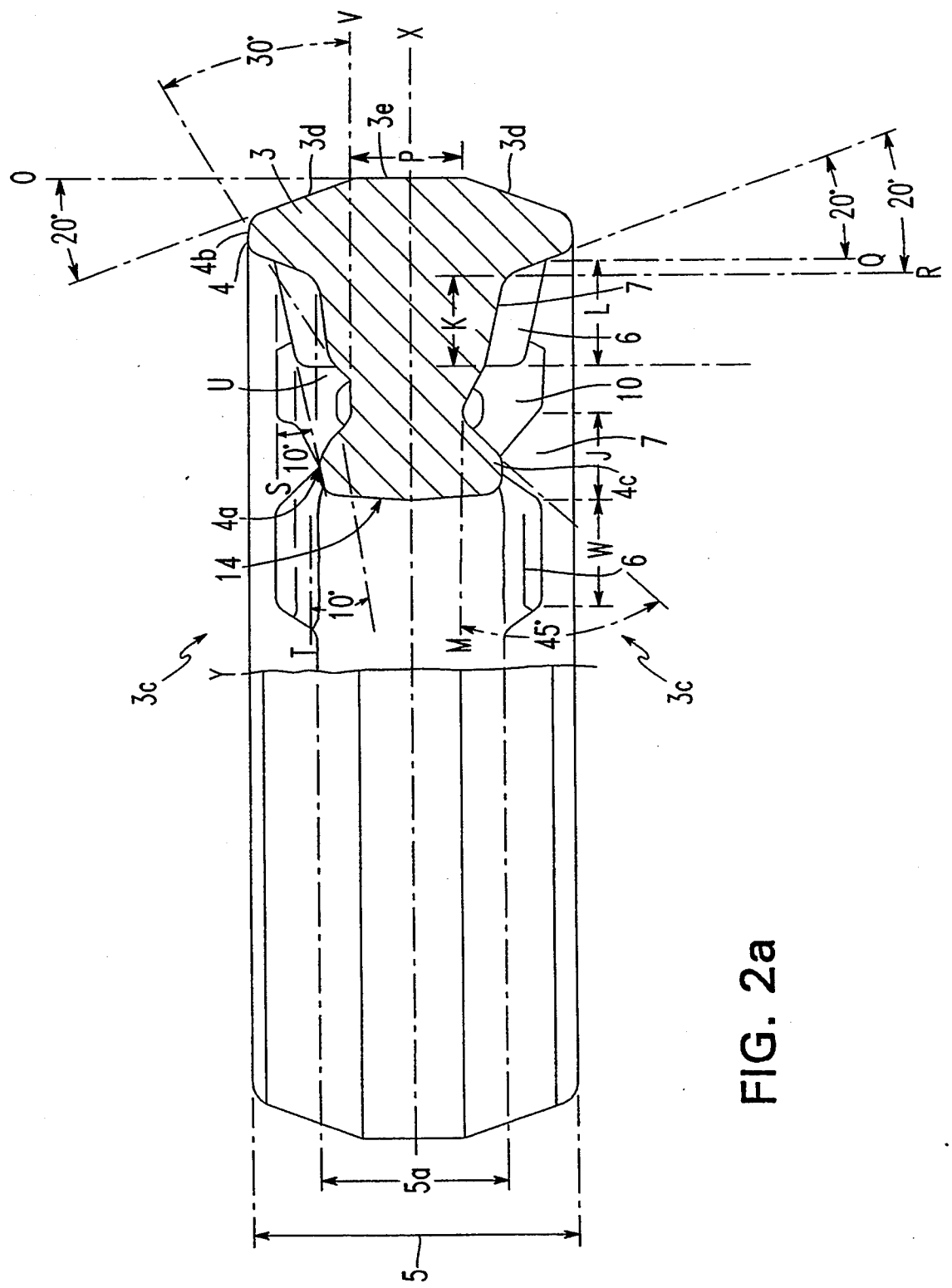
FIG. 2a shows substantially the same view as FIG. 2, but is enlarged and shows additional components.

As shown in FIG. 2, in order to achieve good noise isolation and good suspension characteristics, the rubber gasket 3 can have a greater axial length 5 in its outside circumferential area 4, than in its inside circumferential area. In other words, the axial length 5 of the outside circumferential area 4 can be greater than the axial length 5a of the inner circumferential area 4a, as shown in FIG. 2a. These characteristics can be further improved by means of elevations 6 and/or depressions 7 on the end surfaces 3c, or the top and bottom surfaces of the rubber gasket 3.

In addition, as illustrated in FIG. 1a, one rubber gasket 3 can preferably be made identical to the other rubber gasket 3a. By making the rubber gaskets 3 and 3a identical, excessive assembly time can preferably be eliminated. The reduced assembly time can result because the rubber gaskets 3 and 3a can be the same and therefore interchangeable. Further both of the end surfaces 3c of each rubber gasket 3 and 3a can also be identical, and thus the orientation of the rubber gaskets 3 and 3a, during assembly, can preferably not be important.

The fastening part 9 can have a recess 8, and the rubber gaskets 3 and 3a can have additional recesses 10 so that in the vicinity of the recesses 10, the mechanical stress on the rubber gaskets 3 and 3a can be reduced, which in practice can result in a longer useful life.

Further, the recess 8 in the fastening part 9, may be in the form of a ring or hole. The diameter of the hole may be defined by point 8a on the fastening part 9. The recess or hole 8 can preferably be larger than the center hole 14 on the gaskets 3 and 3a.

In an alternative embodiment, the recess 8, preferably located in the central region of the fastening part 9, may be in the form of a plurality of recesses or slots. The recesses or slots may extend outwardly in a radial direction, at circumferential intervals around a circumference or perimeter. The circumference or perimeter can be defined by point 8a in FIG. 1a.

In addition, the recesses 8 and 10 can preferably serve to prevent any substantial contact between the rubber gaskets 3 and 3a and the fastening part 9 in the vicinity of the inner circumference of the gaskets 3 and 3a and the center hole 14. Such contact between the rubber gaskets 3 and 3a and the fastening part 9 in the vicinity of the inner circumferences of the gaskets 3 and 3a and the center hole 14, may cause the gaskets 3 and 3a to become cracked or damaged causing the gaskets 3 and 3a to deteriorate.

In another embodiment, as illustrated by FIG. 1a, the metal plate 12 can preferably have bumps or projections 12b. The bumps 12b can be located immediately adjacent a sleeve 3b preferably for the piston rod 1. The bumps 12b can preferably be disposed along the bottom surface of plate 12. The bumps 12b can preferably serve to hold the rubber gasket 3 in place in order to prevent twisting of the rubber gasket 3. In addition, the bumps 12b may be disposed in a position which could cause the bumps 12b to interlock with the elevations 6 and the depressions 7 of the gasket 3. This preferable interlocking of the bumps 12b with the elevations 6 and the depressions 7 can also prevent twisting of the gasket 3.

In addition, an additional metal plate 12a can also preferably have bumps or projections 12c. The bumps 12c can be disposed along the top surface of the metal plate 12a in a manner similar to the bumps 12b. The bumps 12c can also serve to prevent twisting of the gasket 3a. Further, the bumps 12c can also be disposed to interlock with the elevations 6 and the depressions 7 of the gasket 3a, to prevent twisting of the gasket 3a.

Further, the fastening plate 9 can also have bumps or projections 12d. The bumps 12d can be disposed along the top and bottom surfaces of the fastening plate 9. Further, the bumps 12d can preferably be disposed along the fastening plate 9, around the hole or recess 8, the diameter of which hole or recess can be defined by point 8a, as discussed previously. The bumps 12d can also serve to prevent twisting of the gaskets 3 and 3a. Further, the bumps 12d can also be disposed to interlock with the elevations 6 and the elevations 7 of the gaskets 3 and 3a.

In an alternative embodiment, the recess 8 may be in the form of a plurality of recesses or slots, as discussed previously. Thus, the bumps 12d may be disposed on the top and bottom of the fastening part 9, along the perimeter defined by point 8a, between each one of the plurality of recesses or slots.

FIG. 2 shows a single rubber gasket 3, the outside circumference 4 of which rubber gasket 3 can have an axial length 5, which axial length 5 is preferably greater than the axial length of the rubber gasket 3 in the vicinity of the center hole 14, as described previously. In addition, the recess 10 can essentially guarantee a corresponding open space, or an open space preferably in the vicinity of the fastening part 9, while the elevations 6 or depressions 7, preferably located on the end surfaces 3c as shown in FIG. 2a, can achieve a soft damping characteristic when impact occurs along the shock absorber assembly.

As illustrated in FIG. 2a, the end surfaces 3c, or the top and bottom surfaces of the gasket 3, can preferably comprise bevels 3d along the outermost side portion of the gasket 3. The bevels 3d can preferably be beveled at an angle of about 20° with respect to line O. In addition, the gasket 3 can comprise a flat portion 3e, having length P at the outermost circumferential point. Further, in one embodiment of the present invention, the bevels 3d and flat portion 3e can preferably be equal in length, thus the bevels 3d may also have a length P.

Moving in a radial direction from right to left in FIG. 2a, the end surfaces 3c of the rubber gasket 3 can comprise a first rim 4b. The rim 4b preferably can project from the gasket 3 in an axial direction, parallel to the center axis Y of the gasket 3. The rim 4b can preferably taper angularly towards center line X, into elevations 6 and depressions 7, at intervals along the end surfaces 3c of the gasket 3. The rim 4b can preferably taper towards line X into an elevation 6 at an angle of about 20° with respect to line Q. At another point on the circumference of the gasket 3, the rim 4b can preferably taper into a depression 7 also at an angle of about 20° with respect to line R.

The elevations 6 can preferably extend from the end surfaces 3c of the gasket 3 in an axial direction, and the depressions 7 can preferably extend into the end surfaces 3c of the gasket 3, in an opposite axial direction of the elevations 6. Further, the elevations 6 and the depressions 7 may preferably be disposed in a symmetrical manner along the end surfaces 3c of the gasket 3.

The elevations 6 can preferably comprise smooth surfaces. The smooth surfaces are preferably sloped at an angle of about 10° with respect to line S, according to FIG. 2a. The depressions 7 can also comprise smooth surfaces. The smooth surfaces of the depressions 7 are also preferably sloped at an angle of about 10° with respect to line T. Further, the elevations 6 can have a length L, and a width W. The length L of the elevations 6 can preferably be substantially equal to the width W of the elevations 6. In addition, the depressions 7 can have a length J and a width K. The length J of the depressions 7 can be substantially equal to the width K of the depressions 7. Further, the length L and width W of the elevations 6, and the length K and width J of the depressions 7, can preferably be substantially similar to one another in their dimensions, or proportions.

Still moving in a radial direction from right to left in FIG. 2a, the elevations 6 and depressions 7 can taper angularly into the recess 10. The elevations 6 can taper in an axial direction parallel to center axis Y, to a point U. At the point U, the elevations 6 and depressions 7 can merge and then can taper into the recess 10 at an angle of about 30° with respect to line V. The recess 10 can preferably be disposed adjacent to a second rim 4c. The second rim 4c can be disposed adjacent the center hole 14. The recess 10 essentially can form a "trough" along the end surfaces 3c of the gasket 3. The recess 10 can then preferably taper into the second rim 4c at an angle of about 45° with respect to line M. Further, the axial length 5a of the second rim 4c can be approximately ⅔ the axial length 5 of the first rim 4b. The second rim 4c can then taper into the center hole 14, which center hole 14 can be cut substantially parallel to center axis Y.

In addition, the distance from the center hole 14 to the elevations 6 and depressions 7 can preferably be ⅔ of the total length of the gasket 3, the total length of the gasket 3 being measured from the center hole 14 to the flat portion 3e. Further, the total number of elevations 6 which can be disposed along the end surfaces 3c of the gasket 3 can preferably be 12, but may be a greater or lesser number. The elevations 6 and depressions 7 may also be arranged symmetrically on the end surfaces 3c of the gasket 3.

Figure 3:
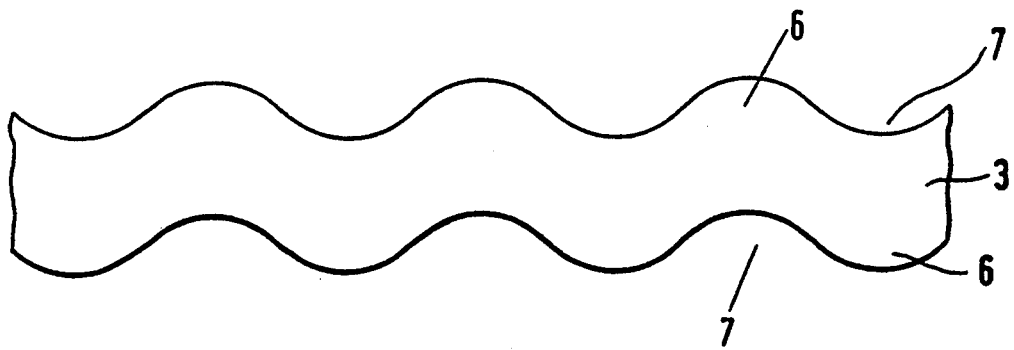
FIGS. 3, 4 and 5 show various configurations of the end surface contour of a rubber gasket.
Figure 4:
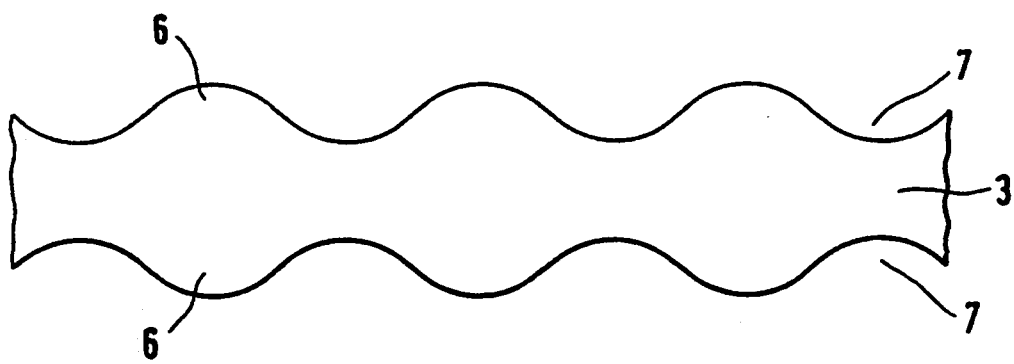
Figure 5:
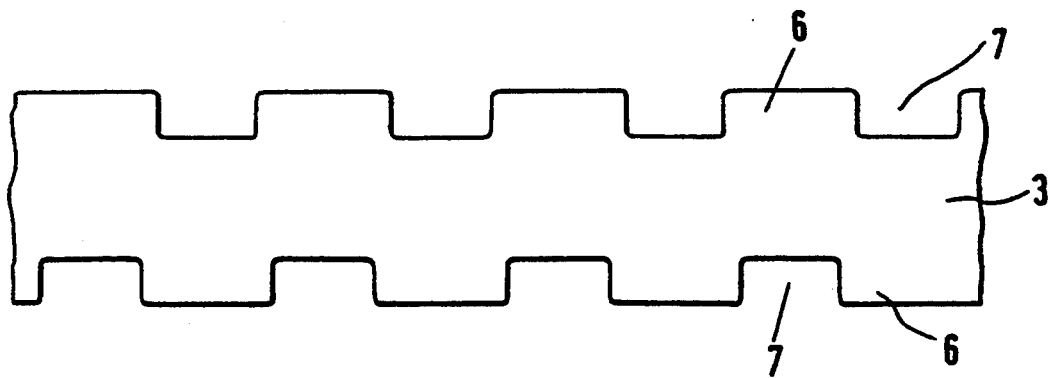

FIGS. 3 to 5 illustrate various embodiments of a rubber gasket 3, whereby a functional periodic configuration of elevations 6 and/or depressions 7 can result in a correspondingly soft damping characteristic when impacts are transmitted to the shock absorber. The rubber gaskets 3 and 3a can have elevations 6 and depressions 7, which elevations 6 and depressions 7 are offset from one another. Thus, the rubber gaskets 3 and 3a can achieve better dynamic characteristics under the stress of compression or the stress of shear forces. By the use of a corrugated profile along the end surfaces 3c of the rubber gaskets 3 and 3a, with the corrugations running in the same or opposite directions, depending on the embodiment, a shear rubber damping characteristic is achieved in the ball and socket joint or steering joint, which also makes it possible to achieve a soft damping characteristic with low settling losses.

In other words, the end surfaces 3c of the gaskets 3 and 3a can each preferably have intervals of elevations 6 and depressions 7. The top and bottom elevations 6 located on the top and bottom surfaces of the gaskets 3 and 3a, can correspond to a bottom and top depression 7, respectively, as illustrated in FIGS. 3 and 5. Alternatively, the elevations 6 located on the top surface can correspond to a bottom elevation 6, or vice-versa, as illustrated in FIG. 4.

Further, as also illustrated in FIGS. 3-5, the contour of the elevations 6 and the depressions 7 can preferably vary. In the embodiments shown in FIGS. 3 and 4, the elevations 6 and the depressions 7 can preferably have a rounded shape. Alternatively, as shown in the embodiment in FIG. 5, the elevations 6 and the depressions 7 may have a rectangular shape, or a shape which comprises cornered elevations 6 and depressions 7.

Figure 6:
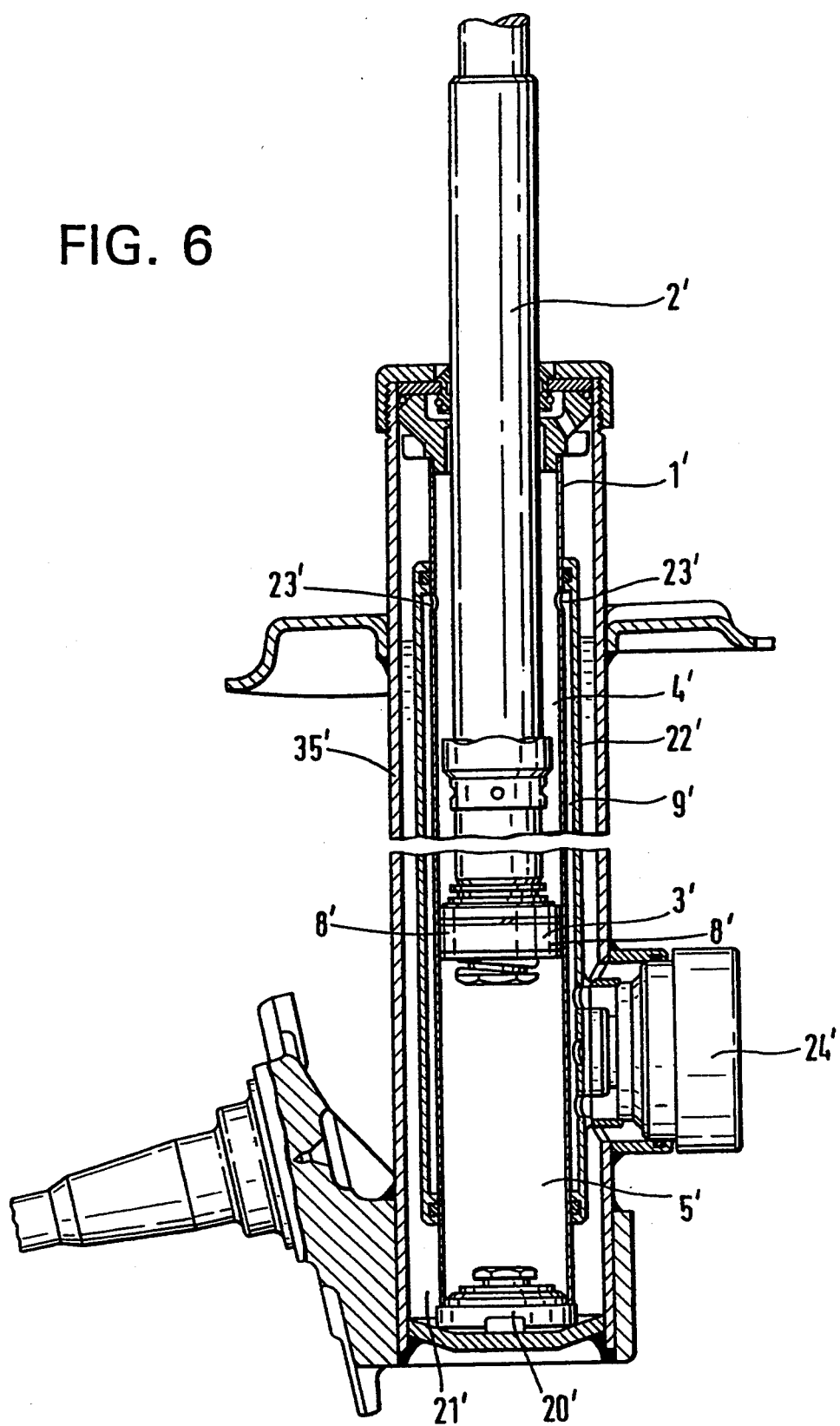
FIG. 6 shows a shock absorber and its components.

FIG. 6 shows an example of a shock absorber, at one end of which the present invention could conceivably be installed. As illustrated in FIG. 6, an adjustable two-tube shock absorber can generally include a cylinder 1', which sealingly contains a hydraulic fluid, a piston rod 2', which piston rod 2' can sealingly project into cylinder 1' and which piston rod 2' can be axially displaceable with respect thereto, and a damping piston 3', which damping piston 3' can be sealingly disposed within cylinder 1' and can be connected to piston rod 2'. Piston rod 2' can be attached to a structure portion, e.g., of a vehicle, which is not shown. Piston 3' can divide cylinder 1' into upper and lower working chambers 4' and 5', respectively, and can be provided with axially throughgoing passages and associated bottle valves 8' of conventional design and well known in the art, which can provide a substantially constant and non-variable resistance to the axial displacement of piston 3' and piston rod 2'.

Two additional cylinders of progressively greater diameter 22' and 35' can be disposed coaxially with cylinder 1', so as to surround cylinder 1', thereby providing two additional annular chambers, a bypass chamber 9' and an equalization chamber 21'. Bypass chamber 9' can preferably interconnect with the working chambers via orifices 23', and a valve 20', located at the bottom of cylinder 1'. The bypass chamber 9' can preferably provide a means by which the damping medium contained therein can reach equalization chamber 21'.

A damping force control unit 24', which can act hydraulically in parallel with throttle valves 8' to modify the substantially constant damping force which throttle valves 8' can provide, can be mounted as a separate component attached to the shock absorber, and can be in fluid communication with bypass 9' and equalization chamber 21'.

One feature of the invention resides broadly in the shock absorber for motor vehicles, with a piston fastened to a piston rod and upper and lower fastening parts, by means of which the shock absorber can be fastened to body or wheel suspension parts, whereby the piston rod and the receptacle, with the interposition of rubber gaskets, is held in a recess of a fastening part connected to the body and to the wheel suspension, characterized by the fact that each rubber gasket 3 has the greatest axial length 5 in the vicinity of the outside circumference 4.

Another feature of the invention resides broadly in the shock absorber, characterized by the fact that the end surfaces, at intervals along the circumference, have elevations 6 running toward, or opposite to one another.

Yet another feature of the invention resides broadly in the shock absorber, characterized by the fact that the end surfaces, at intervals along the circumference, have depressions 7 running toward, or opposite to one another.

Still yet another feature of the invention resides broadly in the shock absorber, characterized by the fact that in the vicinity of the ring-shaped recess 8 of the fastening part 9, there is a rubber gasket 3 with a ring-shaped recess 10.

Examples of shock absorber assemblies which may be utilized in accordance with the embodiments of the present invention may be found in the following United States Patents: U.S. Pat. No. 4,838,393, entitled "Hydro-mechanical Stop having a Restrictive Passage", which issued to Mourray et al. on Jun. 13, 1989; U.S. Pat. No. 4,817,928, entitled "Suspension System", which issued to Paton on Apr. 4, 1989; U.S. Pat. No. 4,527,674, entitled "Shock Absorber with a Hydromechanical Stop", which issued to Mourray on Jul. 9, 1985; U.S. Pat. No. 4,962,916, entitled "Compression Spring", which issued to Palinkas on Oct. 16, 1990; and U.S. Pat. No. 4,756,516, entitled "Resiliently Deformable Element Usable as an End Stop in a Motor Vehicle Suspension", which issued to Tondato on Jul. 12, 1988.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 42 41 853, filed on Dec. 11, 1992, having inventors Josef Groß, Heinz Sydekum, Steffen Heyn, and Kilian Göbel, and DE-OS P 42 41 853 and DE-PS P 42 41 853, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications incorporated herein by reference, form part of the specification and are incorporable into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. An adjustable shock absorber for a motor vehicle, said adjustable shock absorber comprising:
   a sealed cylinder defining a chamber therein;
   said cylinder containing a damping fluid;
   a piston rod sealingly projecting into said cylinder and axially displaceable with respect to said cylinder;
   a piston attached to said piston rod and disposed within said cylinder to sealingly divide said cylinder into first and second chambers;
   a connecting passage for allowing damping fluid to flow between said first and said second chambers;
   a first end and a second end;
   a first attachment means for securing said first end of said shock absorber to one of a body, and a wheel suspension of said motor vehicle;
   said first attachment means comprising:
      at least one gasket;
      said at least one gasket comprising:
         an elastomeric material;
         an outer circumference;
         an inner circumference disposed substantially concentrically to and within said outer circumference;
         an axial axis and a radial axis;
         said radial axis being disposed substantially orthogonal to said axial axis;
         said radial axis being disposed at least from said inner circumference to said outer circumference;
         a radial dimension extending between said inner circumference and said outer circumference;
         a first, raised, portion being disposed substantially immediately adjacent said outer circumference and between said outer circumference and said inner circumference;
         a second portion being disposed at least adjacent said inner circumference and between said outer circumference and said inner circumference;
         said second portion extending between said inner circumference and said first, raised, portion;
         said second portion having a radial dimension extending between said inner circumference and said first, raised, portion, said radial dimension of said second portion being substantially greater than about half of said radial dimension of said at least one gasket;
         said first, raised, portion comprising a maximum thickness along said axial axis;
         said second portion comprising a maximum thickness along said axial axis;
         said maximum thickness of said first, raised, portion being substantially greater than said maximum thickness of said second portion; and a second attachment means for securing said second end of said shock absorber to the other of: the body and the wheel suspension of said motor vehicle.

2. The shock absorber according to claim 1 wherein said second portion further comprises:
   a raised portion, said raised portion of said second portion comprising said maximum thickness of said second portion;
   said raised portion of said second portion being disposed immediately adjacent said inner circumference;
   a third portion disposed between said first, raised, portion and said raised portion of said second portion, said third portion having a minimum thickness along said axial axis; and
   said minimum thickness of said third portion is substantially less than said maximum thickness of said first, raised, portion and substantially less than said maximum thickness of said raised portion of said second portion.

3. The shock absorber according to claim 2 wherein:
   said at least one gasket comprises at least two gaskets, said at least two gaskets being a first gasket and a second gasket;
   said first gasket and said second gasket are identical in shape; and
   said radial dimension of said second portion is substantially greater than half of said radial dimension of said at least one gasket.

4. The shock absorber according to claim 3 wherein said first, raised, portion is configured to accept a greater compressive force than said raised portion of said second portion.

5. The shock absorber according to claim 4 wherein:
   said first gasket comprises a first and a second identical end surface each disposed in a direction substantially parallel to said radial axis;
   said first and second end surface are disposed on opposite sides of said first gasket;
   said second gasket comprises a third and a fourth identical end surface each disposed in a direction substantially parallel to said radial axis; and
   said third and fourth end surface are disposed on opposite sides of said second gasket.

6. The shock absorber according to claim 5 wherein:
   said first, raised, portion of each of said first and second gasket projects from each of said first, second, third, and fourth end surfaces in a direction substantially parallel to said axial axis; and
   said raised portion of said second portion of each of said first and second gasket projects from each of said first, second, third, and fourth end surfaces in a direction substantially parallel to said axial axis.

7. The shock absorber according to claim 6 wherein each of said first, second, third and fourth end surfaces comprise:
   a plurality of elevations and depressions disposed substantially concentrically to said outer circumference and immediately adjacent to said first, raised, portion of each of said first and second gasket;
   said plurality of elevations and depressions alternate along each of said first, second, third and fourth end surfaces;
   ones of said plurality of elevations and depressions extend radially from said third portion to said first, raised, portion;
   ones of said plurality of elevations comprise:
   raised portions projecting in a direction substantially parallel to said axial axis out of each of said first, second, third and fourth end surfaces;
   said raised portions of said plurality of elevations comprise substantially smooth, sloped portions, said substantially smooth, sloped portions extending between said third portion and said first raised portion; and ones of said plurality of depressions comprise:
   depressed portions projecting in a direction substantially parallel to said axial axis into each of said first, second, third and fourth end surfaces; and
   said depressed portions of said plurality of depressions comprise substantially smooth, sloped portions, said substantially smooth, sloped portions of said depressed portions extending between said third portion and said first, raised, portion.

8. The shock absorber according to claim 7 wherein said third portion comprises:
   a ring-shaped recess disposed substantially concentrically to said outer circumference between said plurality of elevations and depressions and said raised portion of said second portion of each of said first and second gasket; and
   said ring-shaped recess projecting into each of said first, second, third and fourth end surfaces in a direction substantially parallel to said axial axis.

9. The shock absorber according to claim 8 wherein said maximum thickness of said raised portion of said second portion of each of said first and second gasket is about $\frac{3}{4}$ of said maximum thickness of said first, raised, portion of each of said first and second gasket.

10. The shock absorber according to claim 9 wherein:
    said first attachment means further comprises:
    a first plate disposed about said piston rod;
    a means for securing said first plate against said piston rod;
    a fastening plate disposed a distance away from said first plate;
    said first gasket is disposed between said first plate and said fastening plate;
    a second plate disposed a distance away from said fastening plate; and
    said second gasket is disposed between said fastening plate and said second plate.

11. The shock absorber according to claim 10 wherein:
    said first attachment means further comprises a sleeve configured to and receiving said piston rod therein;
    said fastening plate comprises a first hole;
    said first hole comprises:
    at least a portion disposed substantially concentrically to said outer circumference and configured to be and disposed around said sleeve;
    a diameter;
    said second portion of said first and second gasket comprises a second hole disposed substantially concentrically to said outer circumference and configured to be and disposed around said sleeve;
    said second hole comprises a diameter; and
    said diameter of said first hole is greater than said diameter of said second hole.

12. The shock absorber according to claim 11 wherein said fastening plate comprises:
    a first side and a second side;
    a first plurality of projections;

ones of said first plurality of projections are disposed along said first and second side of said fastening plate;

ones of said first plurality of projections are disposed adjacent said first hole of said fastening plate; and said ones of said first plurality of projections are configured to and interlock with ones of said plurality of elevations and depressions of said first and second gaskets.

13. The shock absorber according to claim 12 wherein said first plate comprises:
a first side and a second side;
said first side is disposed away from said first gasket;
said second side is disposed towards said first gasket;
a second plurality of projections disposed along said second side of said first plate adjacent said sleeve; and
said ones of said second plurality of projections are configured to and interlock with said ones of said plurality of elevations and depressions of said first gasket.

14. The shock absorber according to claim 13 wherein said second plate comprises:
a third side and a fourth side;
said third side is disposed towards said second gasket;
said fourth side is disposed away from said second gasket;
a third plurality of projections disposed along said third side of said second plate adjacent said sleeve; and
said ones of said third plurality of projections are configured to and interlock with ones of said plurality of elevations and depressions of said second gasket.

15. The shock absorber according to claim 14 wherein:
said first attachment means further comprises:
at least two bolt means for connecting said shock absorber to one of: the body and the suspension parts of said motor vehicle;
a bumper;
said bumper comprises an elastomeric material; and
said bumper is disposed adjacent said second plate and is configured to be and disposed about said piston rod.

16. An adjustable shock absorber for a motor vehicle, said adjustable shock absorber comprising:
a sealed cylinder defining a chamber therein;
said cylinder containing a damping fluid;
a piston rod sealingly projecting into said cylinder and axially displaceable with respect to said cylinder;
a piston attached to said piston rod and disposed within said cylinder to sealingly divide said cylinder into first and second chambers;
a connecting passage for allowing damping fluid to flow between said first and said second chambers;
a first end and a second end;
a first attachment means for securing said first end of said shock absorber to one of a body, and a wheel suspension of said motor vehicle;
said first attachment means comprising:
at least one gasket;
said at least one gasket comprising:
an elastomeric material;
an outer circumference;
an inner circumference disposed substantially concentrically to and within said outer circumference;
an axial axis and a radial axis;
said radial axis being disposed substantially orthogonal to said axial axis;
said radial axis being disposed at least from said inner circumference to said outer circumference;
a first portion being disposed adjacent said outer circumference and between said outer circumference and said inner circumference;
a second portion being disposed adjacent said inner circumference and between said outer circumference and said inner circumference;
a third portion being disposed between said first portion and said second portion, said third portion having a minimum thickness along said axial axis;
said first portion comprising a first raised portion, said first raised portion having a maximum thickness along said axial axis;
said second portion comprising a second raised portion, said second raised portion having a maximum thickness along said axial axis;
said maximum thickness of said first raised portion being substantially greater than said maximum thickness of said second raised portion;
said minimum thickness of said third portion being substantially less than said maximum thickness of said first raised portion and substantially less than said maximum thickness of said second raised portion; and
a second attachment means for securing said second end of said shock absorber to the other of: the body and the wheel suspension of said motor vehicle.

17. The shock absorber according to claim 16 wherein:
said at least one gasket comprises at least two gaskets, said at least two gaskets being a first gasket and a second gasket;
said first gasket and said second gasket are identical in shape;
said first raised portion is configured to accept a greater compressive force than said second raised portion;
said first gasket comprises a first and a second identical end surface each disposed in a direction substantially parallel to said radial axis;
said first and second end surface are disposed on opposite sides of said first gasket;
said second gasket comprises a third and a fourth identical end surface each disposed in a direction substantially parallel to said radial axis;
said third and fourth end surface are disposed on opposite sides of said second gasket;
said first raised portion of each of said first and second gasket projects from each of said first, second, third, and fourth end surfaces in a direction substantially parallel to said axial axis; and
said second raised portion of each of said first and second gasket projects from each of said first, second, third, and fourth end surfaces in a direction substantially parallel to said axial axis.

18. The shock absorber according to claim 17 wherein:
each of said first, second, third and fourth end surfaces comprise:

a plurality of elevations and depressions disposed substantially concentrically to said outer circumference and immediately adjacent to said first raised portion of each of said first and second gasket;
said plurality of elevations and depressions alternate along each of said first, second, third and fourth end surfaces;
ones of said plurality of elevations and depressions extend radially from said third portion to said first raised portion;
ones of said plurality of elevations comprise:
raised portions projecting in a direction substantially parallel to said axial axis out of each of said first, second, third and fourth end surfaces;
said raised portions of said plurality of elevations comprise substantially smooth, sloped portions, said substantially smooth sloped portions extending between said third portion and said first, raised portion;
ones of said plurality of depressions comprise:
depressed portions projecting in a direction substantially parallel to said axial axis into each of said first, second, third and fourth end surfaces;
said depressed portions of said plurality of depressions comprise substantially smooth, sloped portions, said substantially smooth, sloped portions of said depressed portions extending between said third portion and said first raised portion;
said third portion comprises:
a ring-shaped recess disposed substantially concentrically to said outer circumference between said elevations and depressions and said second raised portion of each of said first and second gasket; and
said ring-shaped recess projects into each of said first, second, third and fourth end surfaces in a direction substantially parallel to said axial axis.

19. The shock absorber according to claim 18 wherein said maximum thickness of said second raised portion of each of said first and second gasket is about ¾ of said maximum thickness of said first raised portion of each of said first and second gasket.

20. The shock absorber according to claim 19 wherein:
said first attachment means further comprises:
a first plate disposed about said piston rod;
a means for securing said first plate against said piston rod;
a fastening plate disposed a distance away from said first plate;
said first gasket is disposed between said first plate and said fastening plate;
a second plate disposed a distance away from said fastening plate;
said second gasket is disposed between said fastening plate and said second plate;
a sleeve configured to and receiving said piston rod therein;
said fastening plate comprises a first hole;
said first hole comprises:
at least a portion disposed substantially concentrically to said outer circumference and configured to be and disposed around said sleeve;
a diameter;
said second portion of said first and second gasket comprises a second hole disposed substantially concentrically to said outer circumference and configured to be and disposed around said sleeve;
said second hole comprises a diameter;
said diameter of said first hole is greater than said diameter of said second hole;
said fastening plate comprises:
a first side and a second side;
a first plurality of projections;
ones of said first plurality of projections are disposed along said first and second side of said fastening plate;
ones of said first plurality of projections are disposed adjacent said first hole of said fastening plate;
said ones of said first plurality of projections are configured to and interlock with ones of said plurality of elevations and depressions of said first and second gaskets;
said first plate comprises:
a first side and a second side;
said first side is disposed away from said first gasket;
said second side is disposed towards said first gasket;
a second plurality of projections disposed along said second side of said first plate adjacent said sleeve;
said ones of said second plurality of projections are configured to and interlock with said ones of said plurality of elevations and depressions of said first gasket;
said second plate comprises:
a third side and a fourth side;
said third side is disposed towards said second gasket;
said fourth side is disposed away from said second gasket;
a third plurality of projections disposed along said third side of said second plate adjacent said sleeve;
said ones of said third plurality of projections are configured to and interlock with ones of said plurality of elevations and depressions of said second gasket;
said first attachment means further comprises:
at least two bolt means for connecting said shock absorber to one of: the body and the suspension parts of said motor vehicle;
a bumper; and
said bumper comprises an elastomeric material; and
said bumper is disposed adjacent said second plate and is configured to be and disposed about said piston rod.

* * * * *